United States Patent [19]

Shepel

[11] 4,317,726

[45] Mar. 2, 1982

[54] MICROBIAL FILTER ASSEMBLY

[75] Inventor: Michael Shepel, Frederick, Md.

[73] Assignee: The United States of America as represented by the Secretary of the Army, Washington, D.C.

[21] Appl. No.: 233,758

[22] Filed: Feb. 12, 1981

[51] Int. Cl.³ .............................................. B01D 25/02
[52] U.S. Cl. ................................ 210/236; 210/323.1; 210/477; 210/482; 422/101
[58] Field of Search .................... 210/350, 323.1, 345, 210/477, 482, 236, 474; 435/803, 805, 809, 814; 422/101

[56] References Cited

U.S. PATENT DOCUMENTS 2,775,350 12/1956 Jones ................................ 210/477 X
3,319,792 5/1967 Leder et al. ...................... 210/323.1
3,888,770 6/1975 Avital et al. ..................... 210/474 X Primary Examiner—John Adee
Attorney, Agent, or Firm—Nathan Edelberg; Robert P. Gibson; Harold H. Card, Jr.

[57] ABSTRACT

A filter assembly for fluid containing microbial agents comprises a base defining a first broad filter supporting surface for receiving an appropriate microbial filter membrane, and at least one fluid drain disposed therebeneath to conduct the fluid carrying the microbial samples away from the filter membrane. One or more cover plates may be detachably mounted over the filter supporting surface of the base to sandwich the filter membrane. The cover plates define a corresponding number of tapering inlet ports in axial alignment with the fluid drains disposed in the base to assist in the rapid passage of the microbe-containing fluid to the filter membrane. The inlet ports terminate in reduced-diameter orifices, and ring-like projections annularly disposed about the orifices compress the filter membrane between the cover plate and the base, and form a fluid-tight sandwiching seal that prevents the microbe-containing fluid from escaping past the exposed filter area. A plurality of fluid inlets and corresponding filter drains permits the disposition of several microbial samples on one filter membrane.

19 Claims, 10 Drawing Figures

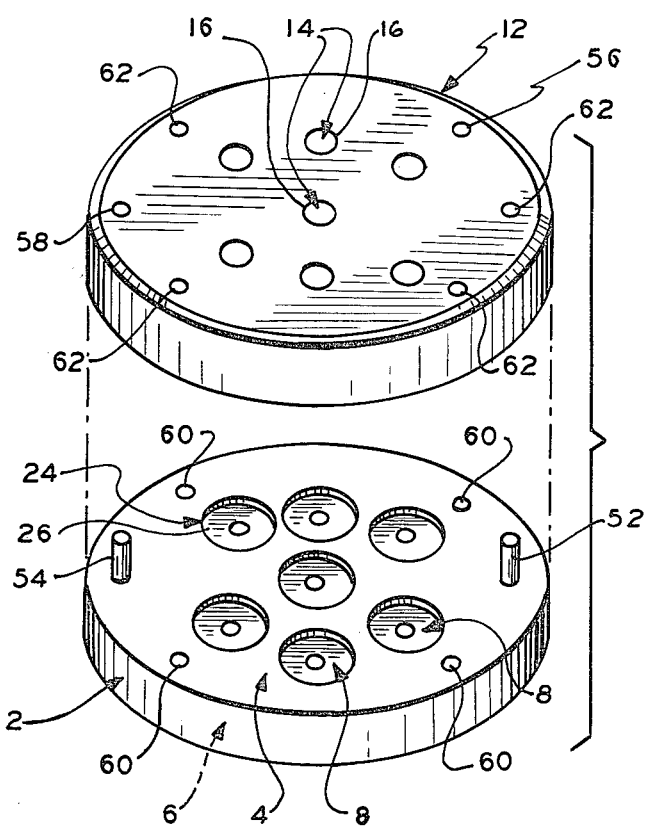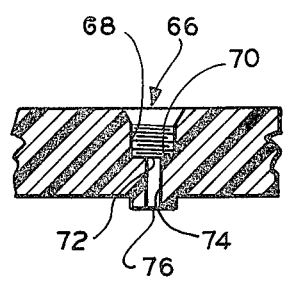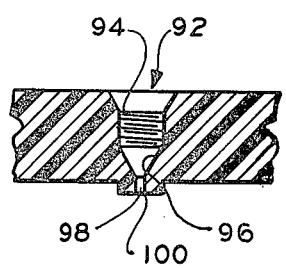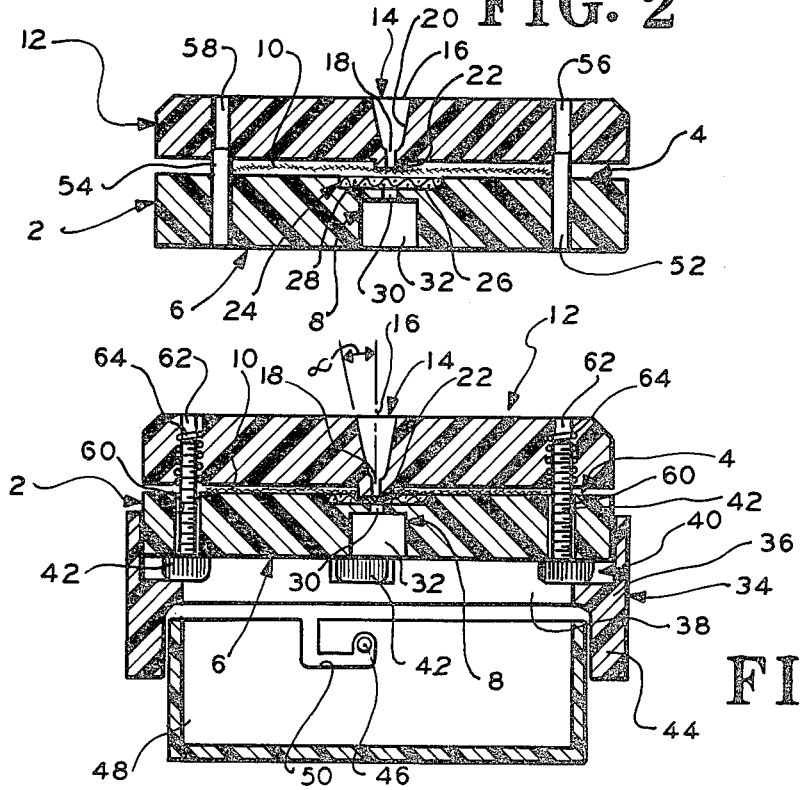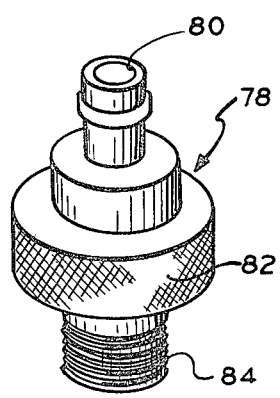

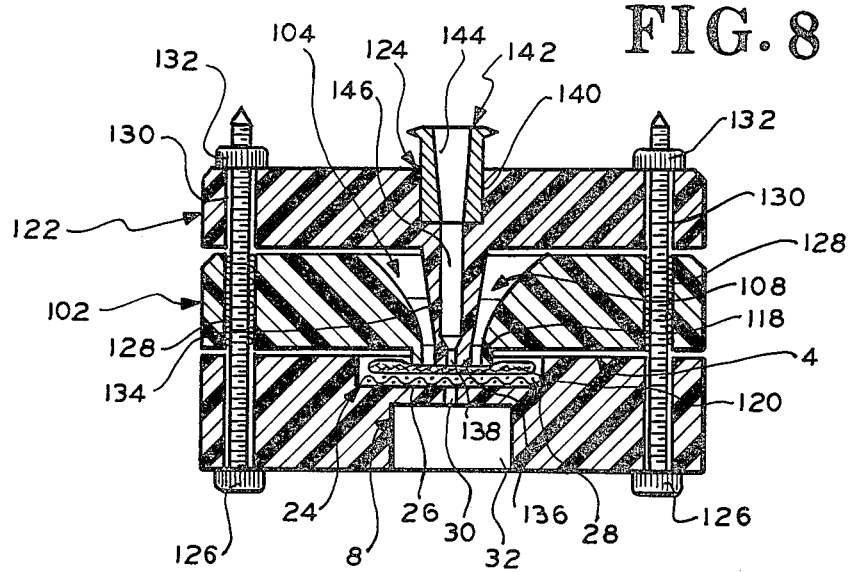
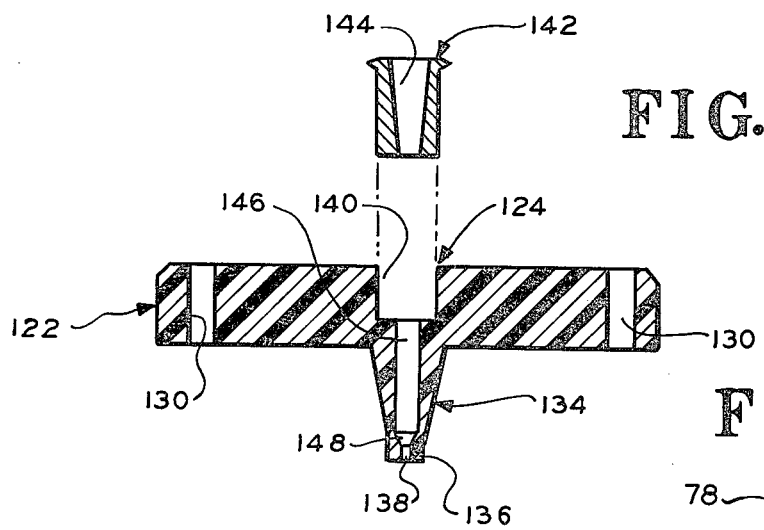
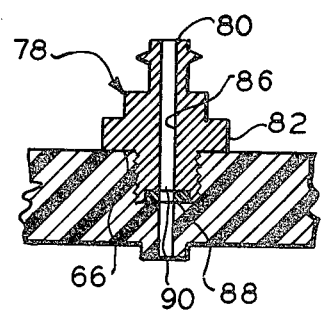
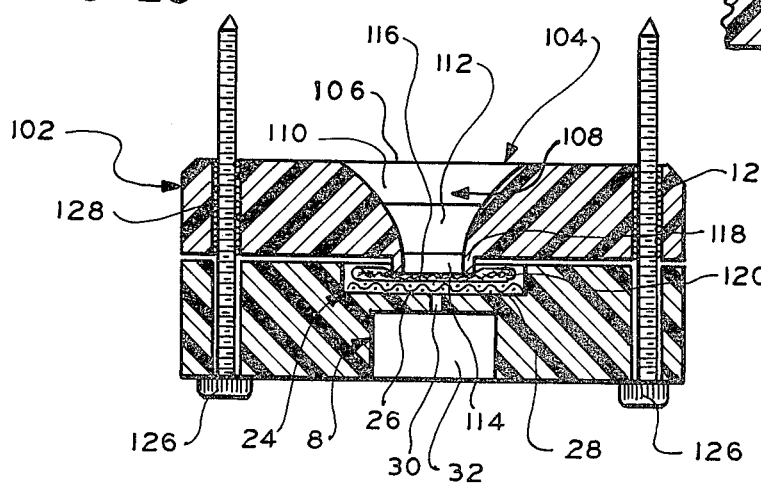

MICROBIAL FILTER ASSEMBLY

GOVERNMENTAL INTEREST

The invention described herein may be manufactured, used and licensed by or for the Government for governmental purposes without payment to me of any royalties thereon.

BACKGROUND OF THE INVENTION

The present invention relates to the area of apparatus for the isolation and detection of microbial samples, and particularly to filter apparatus useful with visual microbial detection techniques.

Most of the existing techniques useful in detecting the existence of certain microbial organisms in a given environment, have involved the collection of samples, and the subsequent inoculation of a growth medium therewith, so that a culture may be propagated over a given period of time to determine the presence of the specific microbial organism. Depending upon the microorganism in question, the growth period for such a culture could extend from twenty-four to ninety-six hours and more.

In addition to the growth medium technique discussed above, microbial samples were gathered and stained, and then observed under a microscope. In one technique, a representative liquid sample would be filtered by pressurized application from a syringe to a filter medium. The filter medium would thereafter be dried, and stained. In another technique, concentration of the microbial organism is accomplished by subjecting a liquid sample thereof to centrifugation, after which the concentrated sample is disposed on a microscope slide, and then stained. The last technique comprises the direct application of a small quantity of the microbe-containing liquid on a slide, which is then appropriately stained and viewed under a microscope. All of the foregoing techniques suffer from the shortcomings of being both inaccurate and time consuming. Particularly in the instance where very low concentrations of microorganisms are suspected, these techniques were inadequate and incapable of detecting organism presence.

Recently, a technique has been developed, which is known as the colorimetric method for microbial detection which gives accurate results at very low microbial concentrations. The colorimetric technique comprises the application of a small quantity of an indicator compound to the microbial sample, and positive results are determined by a color reaction caused by the reaction between the indicator compound and the enzymes of the microorganism. This particular technique is accurate to low levels of concentration, however, the present filtration techniques have been inadequate to achieve the desired sample isolation with regularity and dispatch.

The standard equipment currently used for manual filtration such as that conducted in field investigations comprises a disclike filter membrane clamped within a filter holder and between parallel sealing surfaces or gaskets disposed in contact with the opposite broad surfaces of the filter disc. The top half of the filter holder provides a support for the syringe which dispenses the liquid microbial sample. An air space exists between the surface of the filter membrane and the syringe and application of the sample to the filter medium is accomplished by the depression of the plunger on the syringe to release the liquid therefrom.

This manual filter holder suffers from certain shortcomings. Firstly, the gaskets or seals that clampingly retain the filter membrane frequently leak under pressure, with the result that a portion of the liquid sample and its microbial content bypasses the surface of the filter membrane. Secondly, the air space between the filter surface and the syringe frequently causes a fluid build-up in the intermediate space that causes fluid leakage from back-pressure developed in the apparatus. Thus, portions of the sample either escape from the filter holder apparatus or are deposited on the apparatus rather than on the filter medium. Attempts to force the liquid through the filter medium, by the application of compressed air, frequently damages the fragile microbial cells in the sample.

SUMMARY OF THE INVENTION

The present invention comprises a filter assembly useful with a membrane filter to isolate and detect small numbers of living microorganisms from fluid samples which comprises a filter base defining a first filter supporting surface which receives the membrane filter, and a second broad filter draining surface disposed therebelow. At least one support and drain assembly extends transversely between said broad surfaces to provide fluid registry therebetween. At least one cover plate is detachably secured over said membrane filter to form a sandwich relationship with the filter base. The cover plates include fluid inlet ports provided in axial alignment and equal number to the support and drain assemblies in the base. The inlet ports decrease in internal diameter in the direction of the filter membrane filter and terminate in apical orifices proximate to the filter membrane.

Each inlet port defines a fluid-tight sealing means located in annular relationship to the apical orifice, comprising a circular rim or projection which bears against the filter membrane, and forms a fluid-tight seal about the perimeter of the exposed area of the filter membrane when said cover plate and said base are placed in fast engagement with each other. Alignment between the cover plate and the base during engagement is accomplished by mating alignment means projecting upwardly from the base and corresponding holes provided within the cover. Locking means to secure the cover plate and the base in compressive engagement may likewise be included, and may comprise paired hand-tightening screws extending freely through the base into threaded engagement with the cover plate.

The invention may also include a removable receptacle for self-contained, portable operation of the filter assembly. In this embodiment, the base rests within an adapter sleeve and a removable receptacle is detachably suspended within the sleeve so as to be situated below the base.

In a particular embodiment, the support and drain assemblies define a circular indentation within the first filter supporting surface which is provided with a filter screen for supporting the membrane thereon. Thus, several small diameter filter membranes may be located within the indentation for individual microbial samples. The inlet ports of the cover plate may be gradually tapered at an angle which approximates the angle of taper of a standard medical syringe, so that fluid samples may may be directly injected into contact with the filter membrane. The taper of the inlet port provides an airtight accommodation of the syringe tip which promotes the rapid and uniform transport of the fluid sample out of the syringe and through the filter membrane.

In a preferred embodiment, two cover plates may rest one over the other, and may both be mounted on the same base, and in contact with the filter membrane. A first lower cover plate makes contact along the majority of the area of the filter supporting surface, and defines relatively broad fluid inlet ports, while the second upper cover plate mounts on top of the lower cover plate, and defines a corresponding number of fluid inlet ports that project from its lower surface and are sized to pass through the inlet ports of the lower cover plate to make direct compressive contact with the filter membrane.

The upper cover plate defines permanently mounted syringe tip adaptors and provides pressure-tight access to the filter membrane for the application of the microbe-containing fluid. The sample thus deposited is stained by first removing the upper cover plate, and thereafter applying the desired indicator reagent through the cone-shaped wells or inlet ports of the lower cover plate. The construction of this filter assembly eliminates the need for removing the filter membrane after the microbial sample has been deposited, to apply indicator reagent.

The filter assembly of the present invention is easily assembled and used and is highly portable and particularly well-suited for field testing of active fluids. The design of the sealing means disposed between the cover and the base, in conjunction with the preferred locking means disposed therebetween, prevents fluid leakage and bypass and promotes the maximum collection of microorganisms from each fluid sample investigated. The present filter assembly reduces the effective surface of the membrane filter exposed to a given fluid sample, so that a greater concentration of microorganisms from a given volume of liquid is achieved. This is particularly beneficial in the instance where the small numbers of microorganisms are believed to exist in a given fluid sample.

The rim or projection may be varied in dimension to provide corresponding variations in effective filter area to suit particular detection applications. The filter assembly may define a plurality of regularly spaced fluid inlets and corresponding filter support and drain assemblies, so that a series of sample fluids may be simultaneously filtered and identified.

The present invention is particularly well-suited for use in conjunction with colorimetric detection techniques, whereby the sample, disposed on a filter medium is contacted with a color indicator which is reactive with the enzymes produced by a particular microorganism. The use of the present filter assembly in conjunction with colorimetric techniques, which can provide results of detection within fifteen to thirty minutes time, comprises an extremely rapid, simple and accurate technique for microbial detection and identification.

Accordingly, a principal object of the present invention is to provide a filter assembly for use in the detection of microorganisms, which is capable of efficiently collecting said microorganisms in small numbers.

A further object of the present invention is to provide a filter assembly as aforesaid which is easily and inexpensively constructed and operated.

A still further object of the present invention is to provide a filter assembly as aforesaid which is capable of simultaneously filtering a plurality of liquid samples.

A yet further object of the present invention is to provide a filter assembly as aforesaid which is well-suited for use in conjunction with colorimetric microbial detection techniques.

Further objects and advantages will become apparent to those skilled in the art from a consideration of the ensuing specification which proceeds with reference to the following illustrative drawings.

BRIEF DESCRIPTION OF THE DRAWINGS

FIG. 1 is a blown apart perspective view showing the primary elements of a filter assembly in accordance with one embodiment of the invention.

FIG. 2 is a side sectional view illustrating the filter assembly of FIG. 1 in assembled position.

FIG. 3 is a side sectional view taken at an angle to the section of FIG. 2 showing the filter assembly of FIG. 1 assembled and including a receptacle.

FIGS. 4 and 5 are fragmentary sectional views showing variant inlet ports in accordance with alternate embodiments of the invention.

FIG. 6 is a perspective view showing a syringe adapter useful in accordance with one embodiment of the present invention.

FIG. 7 is a fragmentary side sectional view showing the syringe adapter of FIG. 6 disposed within an outlet port.

FIG. 8 is a side sectional view of a filter assembly in accordance with an alternate embodiment of the invention.

FIG. 9 is a blown apart side sectional view of the assembly of FIG. 8, showing the upper cover plate alone.

FIG. 10 is a side sectional view showing the lower cover plate in position with the base after the removal of the upper cover plate from the assembly of FIG. 8.

DETAILED DESCRIPTION OF THE PREFERRED EMBODIMENT

Referring to FIG. 1, a filter assembly in accordance with one embodiment of the invention is generally shown and comprises a filter base 2 which comprises a first broad filter supporting surfaces 4 and a second broad filter draining surface 6, also illustrated in FIGS. 2 and 3. A plurality of regularly spaced filter support and drain assemblies 8 extend transversely between surfaces 4 and 6 as best shown in FIGS. 2 and 3, to conduct the fluid out of the assembly after it passes through a membrane filter such as membrane 10 illustrated in FIGS. 2 and 3.

A cover plate 12 is provided which may be of similar dimension to filter base 2, as illustrated. Cover plate 12 is adapted to seat over filter supporting surface 4 in the manner shown in FIGS. 2 and 3 to confine membrane 10 in a sandwich-like supported relationship in operation. Cover plate 12 comprises a plurality of inlet ports 14 which are provided for correspondence and axial alignment with support and drain assemblies 8 disposed in base 2. Ports 14 serve as the situs for the introduction of the microorganism-containing fluid, and guide the fluid toward the specific area of membrane 10 through which the fluid is to pass. Ports 14 define entry openings 16 which define the point of greatest diameter of the port. Port 14 extends transversely through cover plate 12 and terminates at a reduced-diameter mouth or apical orifice 18 which is shown in FIGS. 2 and 3 to be proximate to membrane 10 when the filter assembly is fully assembled. Inlet ports 14 include tapering channels 20 which may vary in accordance with alternate embodiments described below and with additional reference to FIGS. 4 and 5.

Referring further to FIGS. 2 and 3, one of the features of the present invention is a filter sealing means defined by the filter assembly, comprising a circular rim or projection 22 disposed in annular relationship about orifice 18. Rim 22 defines the apical end of orifice 18 and forms a fluid-tight seal with membrane 10 by compressing membrane 10 against filter supporting surface 4 when base 2 and cover plate 10 are in the fully assembled state as shown in FIG. 3. By means of the compression developed between rim 22 and surface 4 upon membrane 10, fluid escape and bypass through membrane 10 at the junction of base 2 and cover plate 12 is prevented, and fluid passage is limited to the reduced area defined by orifice 18. This results in a concentration of all present microorganisms in a given fluid sample within a reduced filter area, and facilitates the detection and identification of greater numbers of such microorganisms than has been previously possible with manual filtration and detection.

Referring further to FIGS. 1-3, the filter sealing means of the present invention operates by coaction with the filter support and drain assemblies 8, and in particular the filter support means 24 located within support surface 4. Filter support means 24 comprises a circular indentation 26 which is adapted to house a filter support screen 28. Thus, the portion of membrane 10 adjacent filter support means 24 resides against filter support screen 28, and in operation, is sealably compressed by the impingement thereagainst of the leading edge of rim 22. Sample fluid thus introduced through inlet port 14 travels exclusively through the area of membrane 10 defined within the circumference of rim 22. While a single filter membrane 10 is illustrated, the invention includes the employment of individual membranes 10 having circumferances that enable them to seat entirely within corresponding indentations 26. This arrangement is illustrated in FIGS. 8 and 10, discussed in detail later on.

Referring further to FIGS. 2 and 3, sample fluid traveling through membrane 10 is then directed through the fluid drain portion of support and drain assembly, defined initially by constricted passage 30. Passage 30 is provided with comparable diameter to that of orifice 18 to assure that an even, relatively straight-line fluid flow which is not damaging to membrane 10 may be achieved in operation. This is necessary because the sample fluid is generally introduced under pressure by means of a syringe, not shown herein, the tip of which is inserted into opening 16. As the sample fluid is dispensed under pressure, it is important that sufficient pressure be maintained on both sides of membrane 10 to prevent the undue acceleration of fluid movement and the possible escape of microorganisms by the minute rupture of membrane 10 under pressure.

Fluid travels from constricted passage 30 to increased diameter drain 32, from which it may travel to an appropriate receptacle, where it may be saved for a subsequent filtration or simply discarded. In practice, microbial samples gathered for detection frequently contain a variety of organisms that differ in size, and the same fluid samples may be subjected to a series of filtrations to separately recover each size class, wherein the pore size of the filter membrane may be varied accordingly. Thus, for example, a 0.2 filter paper may be used to recover bacteria while anticipated virus will escape; recovey of the virus could then be accomplished by passing the same fluid sample through a polycarbonate filter having a minimum porosity of 0.08 $\mu$m. Further, because of the provision of multiple filtering sites, the assembly could be fitted with filter membranes of variant porosity, so that a sample passed first through a relatively coarse filter medium, could be recovered from a receptacle placed under drain 32, discussed below, and then passed through a second more sensitive filter medium to recover the smaller sized organisms.

In FIG. 3, the filter assembly is shown in combination with a portable receptacle assembly 34 comprising an adapter sleeve 36 providing a shelf 38 adapted to support base 2 along the periphery of filter draining surface 6. Shelf 38 is provided with regularly spaced pockets 40 which accommodate the knurled heads of thumb screws 42 which may comprise a portion of the assembly locking means holding base 2 and cover plate 12 in tensioned abutment with each other, as will be discussed hereinafter.

Referring further to FIG. 3, adapter sleeve 36 terminates at its lower end in a cylindrical support shroud 44 which includes a receptacle retainer means which may comprise diametrically opposed radially inwardly projecting pins 46, one of which is illustrated frontally in FIG. 3. The receptacle for collecting the filtered fluid may be of conventional shape of such as container 48 shown in FIG. 3, and is preferably provided with a retainer means such as hook-shaped track 50 which is adapted to slidably receive pin 46 when container 48 is adjusted and rotated thereagainst. Thus, the addition of the receptacle assembly possessing the aforementioned components further facilitates the use of the present invention in field testing situations, where a portable, self contained apparatus is desired.

The present filter assembly also includes means for aligning base 2 and cover plate 12 so that inlet ports 14 and support and drain assemblies 8 may be disposed in coaxial alignment. Referring to FIGS. 1 and 2, the alignment means may comprise paired diametrically opposed set pins 52 and 54, disposed, for example, to protrude from base 2 and adapted for communication with cover plate 12 by engagement of respective bores 56 and 58 which extend transversely through cover plate 12 and are of a diameter sufficient to snugly receive set pins 52 and 54. In accordance with this invention, set pins 52 and 54 may be of differing diameter so that exact alignment will always be achieved between base 2 and cover plate 12. Further, through illustration of FIG. 2 suggests that set pins 52 and 54 may be separately fabricated and implanted in base 2 at particular locations, it is to be understood that the present invention contemplates within its scope variable placement of the pins and one piece molding techniques whereby set pins 52 and 54 may be comolded as a unitary structure with the base.

A locking means is provided which may be easily handtightened to hold base 2 and cover plate 12 securely to each other with sufficient force to enable rim 22 to form a fluidtight seal against filter support means 24 to prevent the escape of a fluid sample beyond the circumference defined by orifice 18. While a variety of locking means such as screws, clamps and spring clamps are encompassed by the invention, the locking means illustrated herein comprises a plurality of equally spaced, symmetrical, radially displaced thumb screw assemblies comprising thumb screws 42 journaled within bores 60 in base 2. Thumb screws 42 are adapted to make threaded engagement with corresponding threaded screw holes 62 provided in cover plate 12. In the instance where cover plate 12 is constructed from a material which lacks sufficient hardness to maintain screw threads which will not deteriorate under tension and repeated use, screw holes 62 may be provided with threaded inserts such as helical coils 64, which will define the appropriate screw threads and are sufficiently durable to withstand tension and repeated use. Thus, the above described locking means secures cover plate 12 and base 2 in compressive engagement with each other and enables the fluid tight seal between the filter membrane 10 and the contiguous rim 22 and filter support means 24 to be formed.

As noted earlier, one of the important aspects of the invention comprises the rapid and efficient delivery of the fluid sample to the filter membrane. Generally, the fluid samples may be loaded into dispensing devices such as conventional medical syringes, which are then operated so that the sample is delivered under pressure to the filter membrane. It has been found herein that the rapid and efficient delivery of sample from a dispenser such as a syringe may be accomplished when the inlet port leading to the filter membrane is configured so as to permit the tip of the syringe dispenser to reside in air-tight contact with the inlet port and in greatest proximity to the membrane surface.

As shown in FIGS. 2 and 3, inlet ports 14 are provided with tapered channels 20 which may be disposed at a particular angle with respect to the vertical. A particular angle is illustrated and has been found to be preferably 1° and 32 minutes as subtended by the dotted lines shown in FIG. 3. This particular angle may be used as it approximates the angle of taper of the conventional syringe tip, and therefore facilitates the formation of an air-tight engagement between the syringe tip and channel 20 when full insertion of the tip is made. The tapered construction of the inlet ports permits the syringe tip to move close to orifice 18 and eliminates the problems associated with the development of an air space between the filter membrane and the tip of the syringe. Thus, upon the application of pressure to the sample fluid by depression of the plunger of the syringe, fluid flows quickly and efficiently out of the syringe and directly onto and through the filter membrane, without deposits of any kind forming along the walls of either channel 20 or orifice 18.

The inlet port 14 illustrated in FIGS. 2 and 3 comprises the simplest construction for use in accordance with the present invention, as the syringe may be placed directly within the inlet port, and the sample may be expressed immediately. Referring now to FIG. 4, an alternate configuration of an inlet port is shown in a fragmentary side sectional view of a cover plate. Inlet port 66 shown herein defines an essentially cylindrical channel composed of a first wide-diameter threaded portion 68 which abruptly terminates in a flat wall 70. Wall 70 has centrally disposed therein a second inlet opening 72 which is in fluid registry with a reduced diameter channel portion 74 which travels to termination at an orifice 76. Channel portion 74 is of identical diameter to orifice 76, as inlet port 66 is adapted for use in conjunction with a syringe tip adapter 78 shown generally in perspective in FIG. 6.

Syringe tip adapter 78 is a generally tubular structure having an outer extension terminating in an inlet mouth 80. An increased diameter knurled portion 82 is disposed circumferentially about adapter 78 to facilitate the screw threaded association of adapter 78 with inlet port 66 in the manner shown in FIG. 7. Knurled portion or grip 82 facilitates the rotation of adapter 78 so that external threads 84 disposed on the lower portion of adapter 78 will engage corresponding threads disposed in the wide-diameter portion 68 of inlet port 66. Adapter 78 defines an internal tapered passage 86 which provides fluid registry with channel portion 74 to conduct the fluid sample thereto from the syringe. The taper of passage 86 may correspond to the angle of taper $\alpha$ discussed with respect to inlet port 14, or may vary to suit the size and shape of alternate dispensing means.

The base of adapter 78 is provided with a circular recess which is adapted to house a washer or O-ring 88 for the purpose of providing a fluid-tight seal between adapter 78 and wall 70. O-ring 88 and the lower terminus of passage 86 define an exit opening 90 which assures the continuity of flow of sample fluid from adapter 78 to orifice 76 and contact with the filter membrane.

In the instance where the construction illustrated in FIGS. 4, 6 and 7 is utilized, an additional cover plate is prepared and employed which defines a simple funnel-like tapering inlet port for the application of indicator dye to the sample-containing membrane filter. Such a cover plate is illustrated in FIGS. 8 and 10, and will be discussed later on. The specific methodology associated with the employment of two cover plates in accordance with this embodiment of the invention will be described in greater detail.

A further variant in construction of the inlet port of the present invention is illustrated in FIG. 5. Inlet port 92 as illustrated comprises a first wide-diameter threaded cylindrical bore 94 which is adapted to threadedly receive syringe adapter 78 in similar fashion to that illustrated in FIG. 7 with respect to inlet port 66. Inlet port 92, however, differs from inlet port 66 in that the remainder of the internal channel comprises a gradually tapering passageway 96 which connects with reduced diameter exit channel 98 which in turn terminates in an apical orifice 100. This design eliminates the need for a second cover plate having tapering channels for dispensing the indicator solution after initial filtration, as the tapering passageway 96 facilitates the gradual flow of indicator through orifice 100 to deposit on the filter membrane. Inlet port 92, however, retains the need for use in conjunction with syringe tip adapter 78, as it relies upon the adapter for the tapered passage 86 for insertion therein of the tip of the dispensing syringe.

FIGS. 8–10 illustrate a further embodiment of the present invention wherein the filter assembly utilizes two cover plates simultaneously attached to the filter base in stacked, nesting relation to each other. Thus, a first lower cover plate 102 is shown mounted in direct contact with filter supporting surface 4 and accordingly makes contact with surface 4 along a majority of its area, in the same manner illustrated in the previous embodiments. Lower cover plate 102 defines a relatively broad inlet port 104 that flares outward to a relatively large entry opening 106 better seen in FIG. 10. Inlet port 104 has a flared channel 108 that may be defined by a direct funnel-shaped wall, or, as illustrated herein, may have a stepped angulation defined by upper frustoconical wall segment 110, having a gradual taper, and lower frustoconical wall segment 112, of more abrupt taper. While this segmented construction is illustrated, the invention is not limited thereto.

Flared channel 108 terminates in an essentially cylindrical mouth portion 114 that defines at its terminus a broad apical opening 116. The filter sealing means of inlet port 104 comprises rim 118 that operates like rim 22 to compressively engage the filter membrane labeled 120 herein, which is illustrated as reduced in thickness due to such compression.

Lower cover plate 102 corresponds to the cover plate referred to earlier in the embodiment where two cover plates are alternately attached and removed from the base during the sample deposit and detection operation. Inlet port 104 is thus appropriately configured to accept the deposit of indicator reagent by means such as a conventional eyedropper, in the manner described later on herein. Inlet port 104 is likewise sized to nestably receive the inlet port of upper cover plate 122, so that both cover plates may be mounted simultaneously as shown in FIG. 8.

Upper cover plate 122 is similar in general configuration to lower cover plate 102, and defines one or more inlet ports 124 that extend away from upper cover plate 122 and are sized to seat within broad inlet ports 104 when the respective cover plates are stacked as shown in FIG. 8. Upper cover plate 122 is otherwise similar in configuration to lower cover plate 102, and both cover plates are otherwise similar to cover plate 12, defining openings for the reception of set pins 54 and 56, not shown in FIGS. 8-10, as well as appropriate screw holes to receive elongated thumb screws 126. In particular, lower cover plate 102 is provided with threaded screw holes 128 that operate in similar fashion to threaded screw holes 62, discussed earlier. Upper cover plate 122 possesses unthreaded passages 130 that freely accept thumb screws 126. As shown in FIG. 8, thumb screws 126 project beyond upper cover plate 122, and the latter is secured against lower cover plate 102 by screw threaded engagement with knurled nuts 132. While the locking means of the present invention has been illustrated as a series of peripherally disposed thumb screws, and in the case of FIG. 8, corresponding knurled nuts, it is to be understood that the number and displacement of the locking means may vary, and, for example, may include the disposition of a thumb screw alone, or with a corresponding knurled nut, that is located in central, axial position passing through the filter base and the cover plates. Accordingly, the invention should not be limited to a particular disposition of the locking means illustrated herein.

The configuration and operation of the inlet ports 124 of upper cover plate 122 comprises a particular feature of the embodiment of FIGS. 8-10. Inlet port 124 defines a downwardly extending conduit 134 that tapers to a relatively narrow rim 136 that is adapted to make direct compressive contact with filter membrane 120 in the same manner described earlier with respect to rims 118 and 22. Similarly, rim 136 defines apical orifice 138, through which the fluid sample emerges to pass through filter membrane 120.

Inlet port 124 is similar in certain respects to inlet ports 66 and 92, discussed earlier. Thus, an initial wide diameter portion 140 is provided at the upper surface thereof which preferably receives a syringe tip adapter 142. Syringe tip adapter 142 is an essentially cylindrical structure having a downwardly tapered channel 144 for the purpose of snuggly receiving the tip of a syringe, in corresponding fashion to the tapered channels of inlet port 14, discussed earlier. Syringe adapter 142 may be permanently mounted within wide diameter portion 140, as illustrated in FIG. 8, by placement of a layer of adhesive, such as, for example, Eastman 910 ™ cement. This form of bonding is useful in the instance, as illustrated herein, where syringe adapter 142 is prepared from metal, and upper cover plate 122 is manufactured from a plastic material, however, the invention contemplates the preparation of these components in other ways that may utilize other forms of bonding, or alternatively, may permit syringe adapter 142 to be co-molded with cover plate 122.

Tapered channel 144, at its narrow end, axially abuts essentially cylindrical reduced diameter channel portion 146 that extends for the majority of the length of conduit 134. Channel portion 146, in turn, terminates at funnel 148 that leads into the exit channel terminating in apical orifice 138. By this gradual reduction in diameter of the channel defined by syringe adapter 142 and inlet port 124, uniform pressure is applied to the fluid sample ejected from the syringe, to move the fluid sample into direct contact with the filter membrane 120.

As stated earlier, narrow rim 136 cooperates with the filter support means comprising the circular indentation 26 and the filter support screen 28, to compress filter membrane 120 as illustrated to form a fluid-tight circular seal at the point of contact with the respective rim, to prevent the escape of even a portion of the injected microbial fluid. In similar fashion, rim 118 of lower cover plate 102 forms a fluid-tight seal with membrane 120 that is annularly outwardly displaced from the seal formed by rim 136. The advantage of this construction is that the initial filtration of the microbial sample may be conducted with both cover plates in place as in FIG. 8, and thereafter, by the removal of nuts 132, cover plate 122 may be lifted away, accessing entry opening 106 and flared channel 108, through which an indicator reagent may be added, to perform the test for particular microbes, without the need for either changing the cover plate or removing the filter membrane for separate reagent application. In this sense, the embodiment of FIGS. 8-10 operates in similar fashion to the embodiments of FIGS. 4-7, as the filter membrane may remain stationary within the filter assembly while the configuration of the inlet port is changed by the removal of an element to accommodate the application of testing reagent to the microbe containing filter membrane.

The present filter assembly may be constructed in a variety of ways depending upon the intended application. Thus, for example, the filter base and the cover plate may be circular in shape, as illustrated herein, and as many as seven symmetrically disposed inlet ports and corresponding support and drain assemblies may be provided to facilitate the simultaneous filtration and identification of a corresponding number of microbial samples. Also, as noted earlier, the diameters of the apical orifices may vary depending upon the optimal filter area desired. In particular, the present device as well-suited for the isolation and detection of very small numbers of microorganisms. In the instance where the number of microorganisms per milliliter of fluid sample is believed to reside on the order of $10^3$ or $10^4$, a particularly useful filter area and internal diameter of the apical orifice has been found to be 0.038 $cm^2$ and 0.013 $cm^2$. These particular filter areas were found through testing to result in the isolation of microbial samples having cell numbers one tenth that of samples capable of isolation utilizing larger diameter filter areas, such as 0.196 $cm^2$ and 0.708 $cm^2$ respectively.

Also, as stated earlier, the inlet port is preferably tapered to snugly receive the tip of a conventional syringe dispenser. The dimensions of the apical orifice may naturally be varied between the diameters stated above, in the instance where samples of variant concentrations are being simultaneously gathered, or where it is desired to gather and correlate the results of filtrations of the same sample conducted through filter areas of differing size or porosity. Such variation is therefore considered within the scope of the present invention and encompassed thereby.

In addition, the filter assembly of the present invention may be constructed from a variety of materials and in a variety of ways. In one embodiment, as illustrated herein, the cover plate and filter base are constructed from a plastic material such as transparent Lucite ®. Naturally, this particular material is but one of many materials that may be utilized in the construction of the present invention, as all components may be prepared from other non-porous materials such as metals and the like. In the instance where plastics such as the illustrated synthetic resins are utilized as starting materials, the major components of the assembly may be cast, stamped or otherwise formed in unitary fashion. In the instance where such manufacture is employed, elements such as the set pins disposed on the filter base may be molded in integral fashion with either the base or the cover plate, instead of mounting separate metal pins therein.

A wide variety of metals may likewise be employed to construct the present filter assembly, and certain stainless steels and aluminums such as Aluminum Association 6061 in the T6 Temper are contemplated. In the instance where the helical screw threads and thumb screws are provided separate from the major components of the filter assembly, these parts may be fabricated from the aforementioned metals. Naturally, the present invention encompasses and contemplates within its scope a variety of acceptable materials which are inert in use to the microbial samples being filtered, and the foregoing materials are set forth herein for purposes of illustration only.

The method of the present invention comprises the disposition of either a single filter membrane such as a conventional 47 mm cellulose ester filter across the filter supporting surface of the filter base, or a plurality of individual small diameter filters, each placed within a separate indentation 26, as described earlier. Thereafter, the cover plate is lowered into position over the filter membrane by the alignment of the respective set pins and their corresponding bores. The alignment procedure may be simplified by the provision of divergent diameter set pins and bores, whereby alignment is achieved in a single disposition.

After the cover plate is properly seated over the filter membrane, the thumb screws are rotated into threaded engagement with corresponding threaded screw holes. Tightening of the thumb screws may preferably proceed sequentially and at equal measure in the instance where the cover plate and the base are prepared from synthetic resinous materials, so that excessive tightening of a particular thumb screw will not fracture either the base or the cover plate. The thumb screws should be tightened until substantial resistance to rotation is encountered, so that a fluid-tight seal will be formed between the filter supporting surface and the rims projecting from the apical orifices. The foregoing procedure applies to the seating of lower cover plate 102 in the embodiment of FIGS. 8-10. Additionally, however, upper cover plate 122 is similarly lowered into position on top of cover plate 102, and nuts 132 are then applied to screws 126 and carefully tightened down until rim 136 forms a similar fluid-tight seal with filter membrane 120.

After the cover plate or plates are secured in tight position adjacent the filter base, the assembled filter holder may be placed in the receptacle assembly in the instance where a field test is being conducted. Thereafter, a conventional medical syringe is lowered into a beaker of sample fluid and a portion of fluid is drawn into the syringe. The syringe is then inserted into the inlet port, and thereafter the plunger is depressed to force the sample fluid to exit the syringe and pass through the filter membrane. After the complete expression of sample fluid from the syringe, the syringe is removed and may be loaded with a further quantity of sample fluid to be dispensed within the same filter area. This procedure may be conducted several times to assure the development of a sufficient quantity of countable microbial cells, though the repetition of this sequence is not always desirable or mandatory. In the instance where the expression of sample fluid from the syringe encounters great back pressure of difficulty, dispensing should be shortly terminated, as it is likely that a substantial build-up of microbial cells on the filter membrane has occurred and resistance to fluid flow developed.

After the disposition of the cells on the filter membrane is complete, the filter membrane may either be removed from the filter assembly and placed in a container of color indicator, or a quantity of color indicator may be dispensed through the inlet port to contact the filter area. This latter technique is primarily employed in the instance where the inlet ports shown in FIGS. 4 and 5 are used.

In the instance where the inlet port of FIG. 4 is employed and a syringe adapter such as shown in FIG. 6 is utilized in the dispensing of the sample fluid, the cover plate and the syringe adapter are removed and replaced with a second cover plate shaped like lower cover plate 102, with widely tapering funnel-like inlet ports, through which indicator reagent is then deposited upon the filter area. In the embodiment of FIG. 5, the syringe adapter is merely removed after the sample fluid has been completely dispensed, and the color indicator is then dispensed into the broader area remaining in the inlet port.

Similarly with the assembly of FIGS. 8-10, upper cover plate 122 is removed after the removal of nuts 132, and indicator reagent is dispensed into broad inlet port 104 without the need for moving filter membrane 120.

It has been found that contact with the indicator reagent may be brief and results may be visible within a matter of three to five minutes. At maximum, the present filtration technique utilized in conjunction with colorimetric procedures employing such dyes as tetrazolium, may involve a processing time of approximately thirty minutes. This latter processing time is an outside maximum arbitrarily chosen, inasmuch as the actual test may be completed and read within sixty to ninety seconds of emergence in the color reagent. This compares quite favorably with prior art techniques which involved complex procedures which did not render results until from forty-eight to ninety-six hours after commencement.

One of the features of the filter assembly of the present invention is its sensitivity to small quantities of microorganisms. For example, spot filter tetrazolium reduction testing was performed on cellulose ester filters to illustrate the lowest concentrations of viable Alcaligenes faecalis cells detected in different filtration areas and color development. Accordingly, for sensitivity testing, tenfold dilutions of Alcaligenes faecalis were filtered through different filtration areas comprising respectively, 0.078 cm$^2$, 0.196 cm$^2$, 0.038 cm$^2$, and 0.013 cm$^2$. To carry out this test, a cover plate was prepared which defined inlet ports having apical orifices defining filter areas corresponding to each of the areas to be tested. The bacterial solution to be filtered was prepared in five dilutions ranging from the greatest concentration of $1.6 \times 10^7$ cells per ml to $1.6 \times 10^3$ cells per ml. The samples were applied to the filter membrane by a syringe and the retained bacteria accumulated in a concentrated spot on the filter membrane surface. After filtration of the various samples onto filter membranes was completed, tetrazolium reagent was applied and the spotted cells were colored red as the result of the reduction of the agent to formazan. Though the results of the tetrazolium were apparent after sixty to ninety seconds, fifteen to thirty minutes were allowed arbitrarily as the time for reading reaction with maximum color development and lowest detectible cell concentrations.

In interpreting the results of this colorimetric test, concentration is determined as a function of the color intensity developed, and thus concentrated cell suspensions produced an intense, round, sharply demarcated red disk that covers the filter area within seconds while intermediate reactions between complete coloration and no coloration were seen as faint intensities associated with the halo of a finely irregular colored disk. Color reactions were recorded as plus (+) indicating intense coloration and easy visibility, and plus-minus (+) indicating partial or slight coloration as seen in the intermediate reaction. No attempt was made to interpolate detection on the bases of partial reactions. Accordingly, the end point of detection was taken to be the highest dilution of the original material producing maximum coloration. The results of these tests and observations are summarized in the Table below.

TABLE
SPOT FILTER TETRAZOLIUM TESTS-
VIABLE ALCALIGENES FAECALIS

| FILTRATION AREA (cm$^2$) | AGAR PLATE COLONY FORMING UNITS PER ml | | | | |
|---|---|---|---|---|---|
| | $1.6 \times 10^7$ | $1.6 \times 10^6$ | $1.6 \times 10^5$ | $1.6 \times 10^4$ | $1.6 \times 10^3$ |
| 0.013 | | | + | + | |
| 0.038 | | + | + | 0 | |
| 0.196 | + | + | ± | 0 | |
| 0.708 | + | + | ± | 0 | |

NOTE:
+ = red color development for easy visibility
+ − = faint red color
0 = no color Referring now to the Table, it can be seen that, as the filtration area decreases, the tetrazolium test becomes more sensitive and fewer bacteria are detected. The highest level of sensitivity with the least number of bacteria detected was obtained with filtration areas of 0.013 cm$^2$ which was positive with a concentration of $1.6 \times 10^4$, and 0.038 cm$^2$ which showed a positive reaction with a concentration of $1.6 \times 10^5$. Larger filtration areas obscure the presence of bacteria by a faint or no coloration. Experimental results tend to indicate a direct relationship between the lowest cell concentration that can be detected and the filtration area used in the test. When the filtration area was increased from 0.013 cm$^2$ to 0.038 cm$^2$, the lowest detectable concentration of cells was $1.6 \times 10^5$. These results show that a low concentration of cells can be detected with small filtration areas. Detection of very low cell numbers was precluded only by the limitations of color development for visibility.

In consequence of the findings of the above testing sequence, filtration areas of 0.038 cm$^2$ and 0.013 cm$^2$ have been selected for routine detection testing.

In addition to the tests of viable bacteria as presented above, comparable sensitivity was found with tests of aerobic bacteria including non-spore formers, spore formers and spores. Naturally, the present filter assembly may be employed in a variety of microbial testing techniques including the detection of both viable and non-viable microorganisms, as well as tissue cells and fragments for indirect virus detection. Thus, such techniques as enzyme-labeled antibody detection, and techniques employing specific enzymes tagged with chromophoric labels may be practiced, in addition to a variety of color reactions other than the tetrazolium reduction illustrated herein.

It is to be understood that the invention is not limited to the illustrations described and shown herein, which are deemed to be merely illustrative of the best modes of carrying out the invention, and which are suitable of modification of form, size, arrangement of parts and details of operation. The invention rather is intended to encompass all such modifications which are within the spirit and scope as defined by the claims.

What is claimed is:

1. A filter assembly for use with a filter membrane to detect small numbers of microbial agents which comprises:

a filter base comprising a first broad filter supporting surface for receiving said filter membrane, a second broad filter draining surface disposed in parallel relation therebelow, and at least one filter support and drain assembly extending transversely therebetween to place said filter supporting surface and said filter draining surface in fluid registry with each other;

at least one cover plate disposable over said filter supporting surface having at least one fluid inlet port for receiving a quantity of a fluid containing said microbial agents provided in axial alignment and equal number to said support and drain assemblies, each fluid inlet port defining an internal diameter that decreases in the direction of said filter membrane, said internal port terminating in an apical orifice located proximate to said filter membrane when said cover plate is disposed thereover; and means for forming a fluid-tight seal about a portion of the surface area of said filter membrane to limit the flow through of said fluid, said fluid-tight sealing means comprising a circular rim disposed annularly adjacent said apical orifice and projecting away from said cover plate coaxial to said apical orifice, said circular rim acting to compress said filter membrane against said filter supporting surface to form a fluid-tight sandwiching seal in said filter membrane when said filter base and said cover plate are placed in compressive engagement with each other.

2. The filter assembly of claim 1 wherein said support and drain assembly comprises a filter support means disposed within said filter supporting surface for compressive cooperation with said filter membrane and said sealing means, said filter support means comprising a circular indentation and a filter support screen removably housed therein.

3. The filter assembly of claim 2 wherein said support and drain assembly further includes a fluid drain assembly, said fluid drain assembly comprising a reduced-diameter constricted fluid passage, said constricted fluid passage disposed in axial alignment with said filter support means and said apical orifice, and an increased diameter fluid drain connecting said constricted fluid passage with said filter draining surface.

4. The filter assembly of claim 1 including two cover plates comprising a first cover plate having relatively broad inlet ports and a second cover plate having relatively narrow inlet ports, said second cover plate useful for receiving a quantity of said microbial agent containing fluid and enabling said fluid to contact and pass through said filter membrane, and said first cover plate useful for receiving a quantity of microbe detecting agent and conducting said detecting agent to said filter membrane after said microbial agent containing fluid has passed therethrough.

5. The filter assembly of claim 4 wherein said first and said second cover plates must be mounted on said filter base at separate times.

6. The filter assembly of claim 4 wherein said first and said second cover plates may be mounted simultaneously on said filter base, said first cover plate is compressively mounted against the majority of the area of said filter supporting surface, said second cover plate may be compressively mounted against said first cover plate, and said relatively narrow inlet ports are sized to extend freely into said relatively broad inlet ports to enable the circular rims thereof to contact said filter membrane and form said fluid sandwiching seal therewith.

7. The filter assembly of claims 1 or 6 wherein the internal diameters of said inlet ports are defined by gradually tapering internal channels, said channels having configurations complementary with the outer configuration of the forward tip of a medical syringe, said channels thereby adapted for fluid-tight reception of said syringe tip.

8. The filter assembly of claim 7 wherein said internal diameter is defined by a syringe holder adapter removably mountable within said inlet port, said holder adapter partially mounted within said inlet port and defining an internal channel adapted to receive said medical syringe tip in fluid-tight engagement.

9. The filter assembly of claim 1 wherein said support and drain assemblies and said inlet ports are regularly spaced and symmetrically disposed in relation to said membrane filter.

10. The filter assembly of claim 1 wherein said filter base and said cover plate are essentially circular and disklike in shape and are of a diameter sufficient to completely enclose a forty-seven millimeter membrane filter.

11. The filter assembly of claim 1 wherein said filter base and said cover plates, including said inlet ports and said annular rims are respectively constructed as integral units.

12. The filter assembly of claim 11 wherein said filter base and said cover plates are prepared as respective integral units from a synthetic resinous material.

13. The filter assembly of claim 1 further including means associated with said base and said cover plate for axially aligning said inlet ports and said support and drain assemblies when said base and said cover plate are adjacent each other.

14. The filter assembly of claim 13 wherein said alignment means comprises at least two peripherally disposed set pins projecting transversely and axially from said base, and an equal number of cylindrical bores disposed in said cover plate to receive said set pins when said cover plate is placed adjacent said base.

15. The filter assembly of claims 1 or 6 further including locking means for securing said filter base and said cover plate in compressive cooperation against each other to hold said filter membrane in fluid-tight supported engagement therebetween.

16. The filter assembly of claim 15 wherein said locking means comprises at least two regularly spaced thumb screws journaled and freely rotatably within said filter base, and a corresponding number of axially aligned threaded bores disposed in one of said cover plates, said threaded bores having a frictional strength sufficient to securely engage and hold said thumb screws therebetween when said base and said cover plate are compressively engaged.

17. The filter assembly of claim 6 wherein said first cover plate is adapted to threadedly engage locking means comprising at least two regularly spaced thumb screws journaled within said filter base and extending upwardly therefrom, said second cover plate defines passageways for the free movement of said thumb screws therethrough and said locking means includes nuts corresponding in number to said thumb screws and threadedly engageable therewith to compressively retain said second cover plate in contact with said first cover plate.

18. The filter assembly of claim 1 further including a receptacle assembly adapted to removably receive the periphery of said filter draining surface, to receive and retain said fluid after its passage through said membrane filter.

19. The filter assembly of claim 18 wherein said receptacle assembly comprises a sleeve defining two open ends, said sleeve adapted at the first end thereof to receive and support said filter draining surface, said sleeve adapted at the opposite end thereof to removably receive and suspensibly support a fluid container.

* * * * *